United States Patent [19]

Ebihara et al.

[11] Patent Number: 5,341,178
[45] Date of Patent: Aug. 23, 1994

[54] SEND-OUT CONVERTORS FOR A RECORDING/REPRODUCING SYSTEM

[75] Inventors: Norio Ebihara, Kanagawa; Masakatsu Kaburagi, Tokyo, both of Japan

[73] Assignee: Sony Corporation, Tokyo, Japan

[21] Appl. No.: 959,541

[22] Filed: Oct. 13, 1992

[30] Foreign Application Priority Data

Oct. 18, 1991 [JP] Japan .................. 3-297633

[51] Int. Cl.⁵ .......................................... H04N 5/268
[52] U.S. Cl. ................................ 348/705; 348/441; 360/14.3; 358/335
[58] Field of Search ............. 358/181, 140, 311, 335; 360/14.1, 14.2, 14.3, 40, 48; 348/705, 441; H04N 5/268

[56] References Cited

U.S. PATENT DOCUMENTS

| | | | |
|---|---|---|---|
| 4,532,557 | 7/1985 | Larkins | 360/14.3 |
| 4,586,093 | 4/1986 | Fukuju et al. | 360/48 |
| 4,858,027 | 8/1989 | Sashou et al. | 360/14.3 |
| 4,864,421 | 9/1989 | Morioka et al. | 358/335 |
| 5,243,416 | 9/1993 | Nakazawa | 358/181 |
| 5,255,103 | 10/1993 | Honjo | 358/335 |
| 5,280,397 | 1/1994 | Rhodes | 358/339 |

FOREIGN PATENT DOCUMENTS

WO91/03909 3/1991 PCT Int'l Appl. ............ H04N 9/79

OTHER PUBLICATIONS

SMPTE Journal vol. 100, No. 1, Jan. 1991, Scarsdale, N.Y. US pp. 19-22, XP000173303 'A Complete Post-Production System for All Video Formats'.
Rundfunktechnische Mitteilungen vol. 34, No. 4, Jul. 1990, Norderstedt DEL pp. 173-183, XP000160599 Herbert Hoffmann et al. 'Ein Universelles Rahmenkonzept Fur Die Digitale Ubertragung VOL TV-Signalen Unterschiedlicher Quellencodierformate Uber 140-MBIT/S-VERBINDUNGEN'.

Primary Examiner—Mark R. Powell
Assistant Examiner—Jeffrey S. Murrell
Attorney, Agent, or Firm—William S. Frommer; Alvin Sinderbrand

[57] ABSTRACT

A first recording/reproducing unit 1, a second recording/reproducing unit 2 and a third recording/reproducing unit 3 are interconnected by a routing switch 4 to which is connected a bit rate converter 5 having first to third bit rate converting circuits 10 to 12 enabling data exchange between the recording/reproducing units 1 to 3. When the transmitting VTR and the receiving VTR are decided, the routing switch 4 transmits data from the transmitting VTR to the bit rate converter 5 where the bit rate of the data is changed to the bit rate handled by the receiving VTR before the data is supplied to the receiving VTR. Data exchange may be made between VTRs having different data bit rates.

10 Claims, 5 Drawing Sheets

| FROM \ TO | | P/S 143 (MB/sec) | | | 270 (MB/sec) | | 360 (MB/sec) | |
|---|---|---|---|---|---|---|---|---|
| | | COMPOSITE | COMPONENT | WIDESCREEN (COMPONENT) | COMPONENT | WIDESCREEN (COMPONENT) | WIDESCREEN (COMPONENT) | |
| P/S 143 (MB/sec) | COMPOSITE | | (91) DEC BRD | (92) DEC BRD ADD | (a) DEC RC | (b) DEC RC ADD | (g) DEC RC ADD | |
| | COMPONENT | (93) BEP ENC | | (94) BRD ADD | (c) BEP | (d) BEP ADD | (h) BEP RC ADD | |
| | WIDESCREEN (COMPONENT) | (95) BEP ENC MSK | (96) BEP MSK | | (e) BEP MSK | (f) BEP | (i) BEP | |
| 270 (MB/sec) | COMPONENT | (l) RC ENC | (k) BRD | (l) BRD ADD | | (97) | (p) ADD | |
| | WIDESCREEN (COMPONENT) | (m) RC ENC MSK | (n) BRD MSK | (o) BRD | (98) BEP MSK | | (q) BEP | |
| 360 (MB/sec) | WIDESCREEN (COMPONENT) | (r) RC ENC MSK | (s) BRD RC MSK | (t) BRD | (u) MSK | (v) BRD | | |

SEND-OUT CONVERTORS FOR A RECORDING/REPRODUCING SYSTEM

BACKGROUND OF THE INVENTION

1. Field of the Invention

This invention relates to a send-out system for recording/reproduction enabling plural recording/reproducing apparatus having different bit rates to be used for reciprocal signal exchange.

2. Description of the Prior Art

As systems digitizing and recording video signals, there are currently known a digital video tape recorder of a so-called D1-format (D1VTR) and a digital video tape recorder of a D2-format (D2VTR).

With the D1VTR, recording and/or reproduction is performed with 10-bit-per-sample luminance data Y, obtained on sampling luminance signals Y at a sampling frequency of 13.5 MHz, and with 10-bit-per-sample first and second chroma (chrominance) data $C_1$, $C_2$, obtained on sampling color difference signals R-Y and B-Y with a sampling frequency of 6.75 MHz, respectively, as video data.

With the above D1VTR, the luminance data Y with the bit rate of 13.5 MHz/10 bits and the chroma data $C_1$, $C_2$ with the bit rate each of 6.75 MHz/10 bits, that is component data, are transmitted via serial interface as 270 MB/sec serial data.

With the D2VTR, video data are recorded and/or reproduced as the 10-bit-per-sample composite data, obtained upon sampling composite video signals with a sampling frequency of 14.3 MHz.

The D2VTR transmits the composite data with the bit rate of 14.3 MHz/10 bits via a serial interface as 143 MB/sec serial data.

The D1VTR and D2VTR, capable of assuring a high picture quality, are in current use mainly in broadcasting stations.

In keeping with the users' propensity towards AV in recent years, development of a widescreen video tape recorder (widescreen VTR), in which only the aspect ratio of the NTSC system, the standard system adopted in Japan, is changed from 4:3 to 16:9 in recording and/or reproduction, is proceeding, as for example in EDTV2 (extended or high definition television 2).

With the widescreen VTR, recording and/or reproduction is performed with 10-bit-per-sample luminance data, obtained on sampling luminance signals Y at a sampling frequency of 18 MHz, and with 10-bit-per-sample first and second chroma (chrominance) data $C_1$, $C_2$, obtained on sampling color difference signals R-Y and B-Y each with a sampling frequency of 9 MHz, respectively, as video data.

With the widescreen VTR, the luminance data with the bit rate of 18 MHz/10 bits and the chroma data $C_1$, $C_2$ with the bit rate each of 9 MHz/10 bits, that is component data, are transmitted via serial interface as 360 MB/sec serial data.

As may be seen from above, recording/reproducing apparatus with various bit rates are in current use. It may be predicted that recording/reproducing apparatus having bit rates different from those of the above recording/reproducing apparatus may be developed in future.

Should the recording/reproducing apparatus having different bit rates be used in future, it may be desirable to exchange video data between recording/reproducing apparatus having different bit rates, as when the video data reproduced from a D1VTR is desired to be recorded on D2VTR. In such case, the bit rate may be changed by a rate converter for converting the 270 MB/sec video data into 143 MB/sec video data or a masking circuit for converting 360 MB/sec video data into 143 MB/sec video data. It is desired to use these rate converting means integrally to enable video data to be exchanged between the recording/reproducing apparatus with different bit rates.

OBJECT AND SUMMARY OF THE INVENTION

In view of the above-depicted status of the art, it is an object of the present invention to provide a send-out system for recording/reproducing apparatus whereby video data may be exchanged between recording/reproducing apparatus having different bit rates.

For accomplishing the above object, the present invention provides a send-out system for recording/reproducing apparatus comprising a plurality of recording/reproducing apparatus having different bit rates of signals handled thereby, a plurality of bit rate converting means for reciprocally changing bit rates of signals handled by the recording/reproducing apparatus, and input/output changeover means for selecting those apparatus outputting a signal and receiving the signal and selecting and interconnecting those bit rate converting means associated with the selected apparatus.

With the send-out system for recording/reproducing apparatus according to the present invention, input/output changeover means select those recording/reproducing apparatus outputting a signal and receiving the signal, while selecting and interconnecting those bit rate converting means associated with the selected apparatus.

EMBODIMENT

Referring to the drawings, certain preferred embodiments of a send-out system for a recording/reproducing apparatus according to the present invention will be explained in detail.

Figure 1:
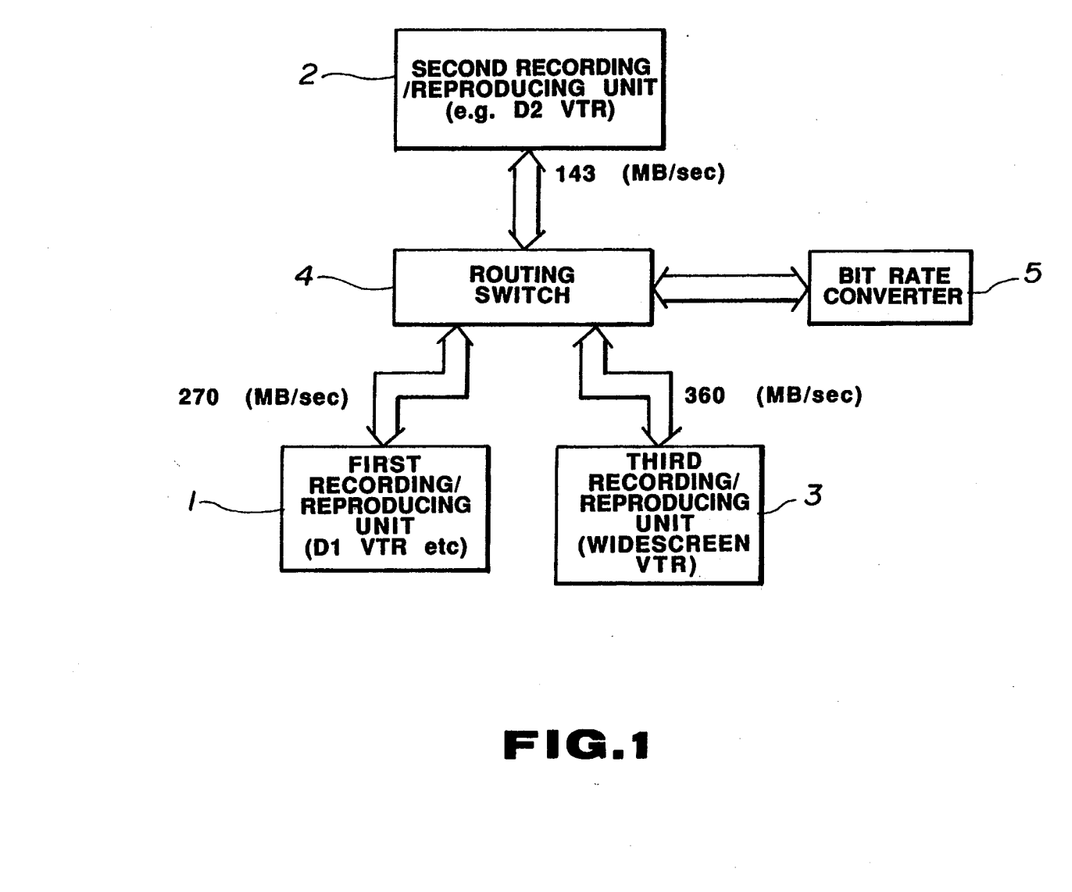
FIG. 1 is a block diagram showing an arrangement of a send-out system for recording/reproducing apparatus according to the present invention.

The send-out system for the recording/reproducing apparatus of the present embodiment is arranged as shown for example in FIG. 1.

The send-out system for the recording/reproducing apparatus shown in FIG. 1 includes, as plural recording/reproducing apparatus having different bit rates for video data, a first recording/reproducing unit 1 having plural recording/reproducing apparatus (VTRs) handling video data of a bit rate of 270 MB/sec, a second recording/reproducing unit 2 having plural recording/reproducing apparatus (VTRs) handling video data of a bit rate of 143 MB/sec, and a third recording/reproducing unit 1 having plural recording/reproducing apparatus (VTRs) handling video data of a bit rate of 360 MB/sec.

The first to third recording/reproducing apparatus 1 to 3 are interconnected by a routing switch 4 constituted by a switch operated as input/output switching means. A bit rate converter 5, composed of plural bit rate converting means, is connected to the routing switch 4.

Figure 2:
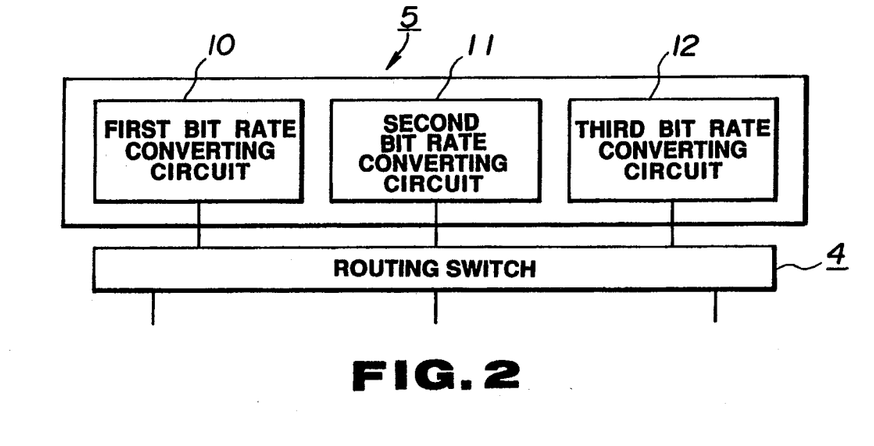
FIG. 2 is a block diagram showing an arrangement of a bit rate converter of the send-out system shown in FIG. 1.

Referring now to FIG. 2, the bit rate converter 5 includes, as the above-mentioned bit rate converting means, a first bit rate converting circuit 10 for converting the video data having a bit rate of 143 MB/second into video data having the bit rate of 270 MB/second and for converting the video data having a bit rate of 270 MB/second into video data having the bit rate of 143 MB/second, a second bit rate converting circuit 11 for converting the video data having a bit rate of 143 MB/second into video data having the bit rate of 360 MB/second and for converting the video data having a bit rate of 360 MB/second into video data having the bit rate of 143 MB/second and a third bit rate converting circuit 12 for converting the video data having a bit rate of 270 MB/second into video data having the bit rate of 360 MB/second and for converting the video data having a bit rate of 360 MB/second into video data having the bit rate of 270 MB/second.

The bit rate converter 5, which will be explained subsequently in more detail, performs the above-mentioned bit rate conversion by employing an optimum one of plural circuits consisting of a decoder (DEC) for converting composite data into component data, an encoder (ENC) for converting the component data into composite data, a bit reduction circuit (BRD) for reducing the number of bits of video data, an adder circuit (ADD) for making up for a deficit of video data on a screen, such as by a black screen region, a rate converter (RC) for converting the bit rate of the video data, a bit expander (BEP) for increasing the number of bits of the video data and a masking circuit (MSK) for masking excess video data on the screen.

Referring back to FIG. 1, the first recording/reproducing unit 1, handling the video data of the bit rate of 270 MB/second, includes a D1 video tape recorder (D1VTR) for recording/reproducing video signals as component data and a VTR for recording/reproducing video signals for a widescreen having an aspect ratio of 16:9 as component data.

The second recording/reproducing unit 2, handling the video data of the bit rate of 270 MB/second, includes a D2 video tape recorder (D2VTR) for recording/reproducing video signals with composite data, a VTR for recording/reproducing video signals with component data and another VTR for recording/reproducing video signals for the above-mentioned widescreen with component data.

The third recording/reproducing unit 3, handling video signals having the bit rate of 360 MB/second, includes a widescreen VTR for recording/reproducing video signals for the above-mentioned widescreen by component data.

The operation of the above-described send-out system for the recording/reproducing apparatus of the present embodiment is hereinafter explained by referring to FIG. 3 in which those circuits of the bit rate converter 5 which are employed for bit rate conversion are shown diagrammatically.

The manner in which playback data from D2VTR provided in the second recording/reproducing unit 2 for handling 143 MB/sec composite data are supplied to D1VTR provided in the first recording/reproducing unit 1 for handling 270 MB/sec component data is explained.

The D2VTR handles composite data having the bit rate of 143 MB/sec, while the D1VTR handles component data having the bit rate of 270 MB/sec. Consequently, the composite data of 143 MB/sec, outputted via a serial interface from D2VTR, are supplied to the routing switch 4.

The routing switch 4 supplies the composite data of 143 MB/sec from D2VTR to the first bit rate converting circuit 10 within the bit rate converter 5.

Figure 3:
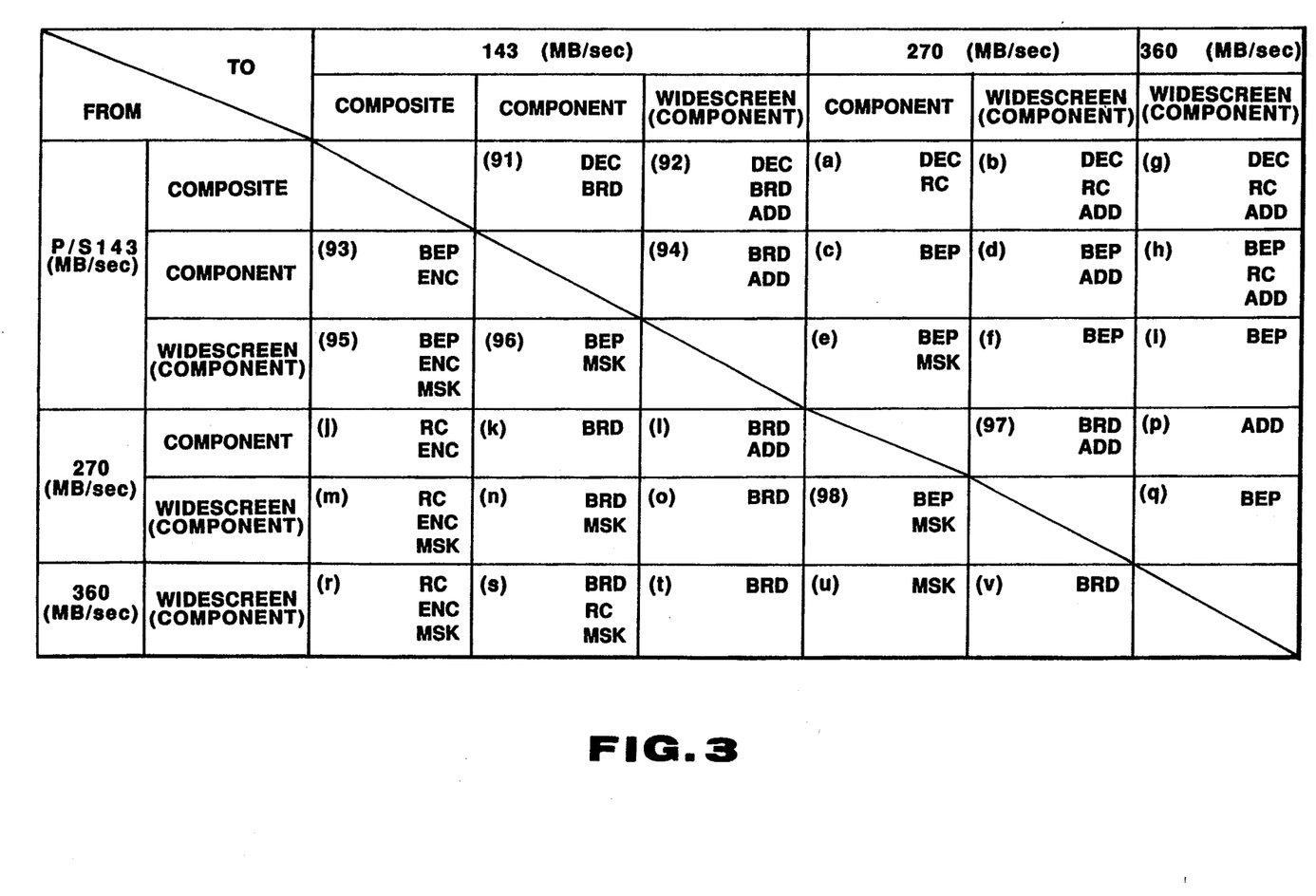
FIG. 3 shows circuits of the bit rate converter which are employed for bit rate conversion in the system shown in FIG. 1.

The first bit rate converting circuit 10 converts the composite data of 143 MB/sec into component data of 270 MB/sec, using DEC and RC, as shown in FIG. 3a.

Figure 4:
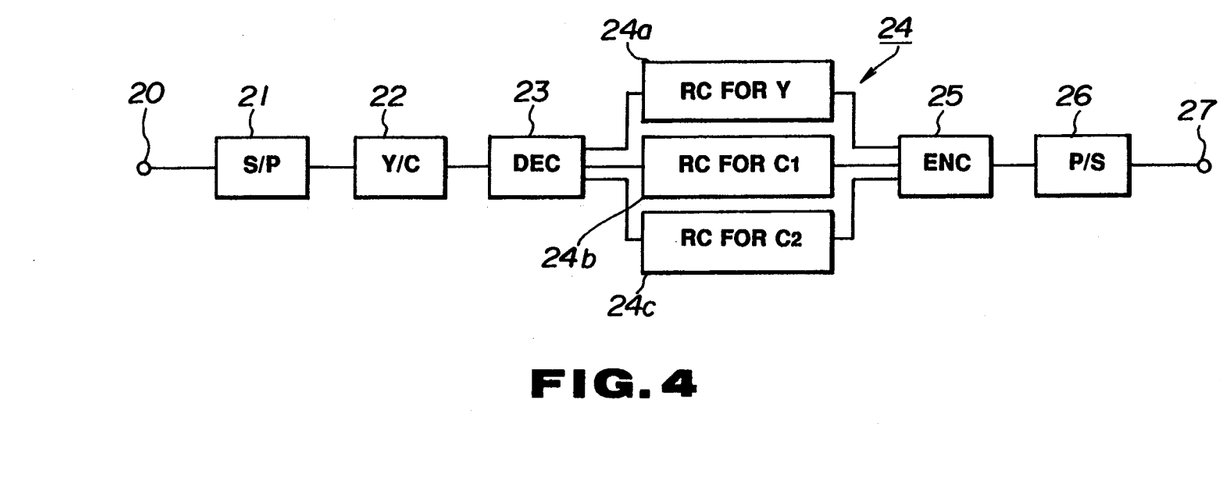
FIG. 4 is a block diagram showing DEC and RC provided in the bit rate converter.

That is, the first bit rate converting circuit 10 supplies the composite data of 143 MB/sec to an S/P converter 21 via a input terminal 20 in FIG. 4.

The S/P converter 21 converts the composite data of 143 MB/sec supplied as serial data into parallel data of 14.3 MHz/10 bits to supply the parallel data to a Y (luminance data)/C (chroma data) separator 22.

The Y/C separator 22 separates the composite data of 14.3 MHz/10 bits from the S/P separation into luminance data Y and first and second chroma data $C_I$ and $C_Q$ to supply the separated data to DEC 23.

The DEC 23 converts the luminance data Y and first and second chroma data $C_I$, $C_Q$, separated from the composite data, into component data, i.e. luminance data Y and first and second chroma data $C_1$, $C_2$, to transmit the luminance data Y to an RC circuit 24a for luminance data Y in RC 24 as well as to transmit the first and second chroma data $C_1$ and $C_2$ to RC circuit 24b for $C_1$ and RC circuit 24c for $C_2$, respectively.

RC 24a for Y processes the luminance data of 14.3 MHz/10 bits by sampling rate conversion to produce luminance data Y having the bit rate of 13.5 MHz/10 bits.

The RC 24b for $C_1$ and RC 24c for $C_2$ process the first and second chroma data of 14.3 MHz/10 bits by sampling rate conversion to produce first and second chroma data $C_1$ and $C_2$ each having the bit rate of 6.75 MHz/10 bits.

The luminance data Y of 13.5 MHz/10 bits and the first and second chroma data $C_1$, $C_2$ each having the bit rate of 6.75 MHz/10 bits are supplied to ENC 25.

The ENC 25 rearrays the luminance data Y and chroma data $C_1$, $C_2$ into chronological parallel data to form component data of 27 MHz/10 bits.

These parallel data are supplied to a parallel to serial (P/S) converter 26.

The P/S converter 26 converts the above-mentioned component data, that is the parallel data of 27 MHz/10 bits, into serial data of 270 MB/second to output the produced serial data at output terminal 27.

In this manner, the first bit rate converter 10 converts the composite data of 143 MB/sec into component data of 270 MB/sec.

The serial data of 270 MB/sec are transmitted to routing switch 4.

The routing switch 4 transmits the composite data of the bit rate of 270 MB/sec from the first bit rate converter 10 to D1VTR.

In this manner, the composite data of 143 MB/sc from D2VTR may be supplied to D1VTR handling component data of 270 MB/sec for recording/reproduction.

The manner in which playback data from D2VTR provided in the second recording/reproducing unit 2 is supplied to VTR handling component data for widescreen having the bit rate of 270 MB/sec is explained.

The playback data from D2VTR (composite data) are outputted as serial data of 143 MB/sec via a serial interface, not shown. These serial data are supplied to routing switch 4. Routing switch 4 transmits the serial data of 143 MB/sec from D2VTR to first bit rate converter 10 within the bit rate converter 5.

Using DEC, RC and ADD, the first bit rate converter 10 converts the composite data of 143 MB/sec into component data or widescreen having the bit rate of 270 MB/sec.

That is, the first bit rate converter 10 converts the composite data of 143 MB/sec into component data of 270 MB/sec, using DEC 23 and RC 24 explained in connection with FIG. 4.

The first bit rate converter 10 transmits the 270 MB/sec component data to adder ADD.

Figure 5:
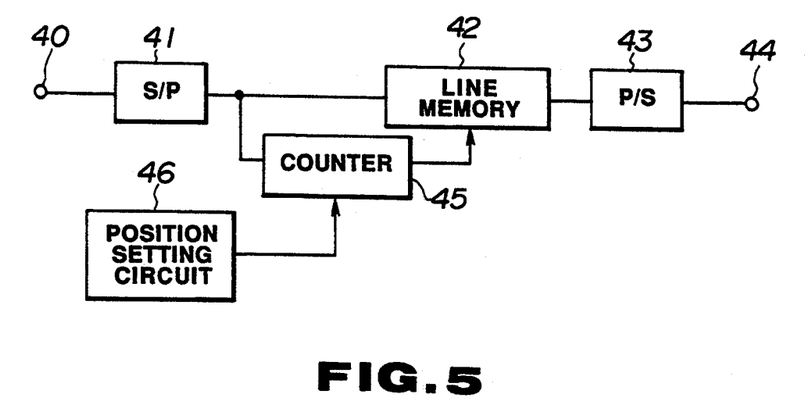
FIG. 5 is a block diagram showing MSK and ADD provided in the bit rate converter.

Referring to FIG. 5, the adder ADD is made up of a line memory 42 having a data writing region for widescreen data with an aspect ratio of 16:9, a position setting circuit 46 for deciding the writing or reading position for data supplied to line memory 42, and a counter 45.

The 2.70 MB/sec component data are first supplied via input terminal 40 to an S/P converter 41. S/P converter 41 converts the 270 MB/sec component data into parallel data of the bit rate of 27 MHz/10 bits which are supplied to line memory 42 and counter 45.

The component data of 27 MHz/10 bits are data conforming to the aspect ratio of 4:3 of the NTSC system which is the standard system currently adopted in Japan. For displaying the data with the aspect ratio of 4:3 on a widescreen having an aspect ratio of 16:9, data with the aspect ratio of 4:3 is narrower by an amount the widescreen is longer. Consequently, a picture corresponding to the data having the aspect ratio of 4:3 is displayed at a mid region of the widescreen and a black picture corresponding to the deficit is appended to both ends of the displayed screen to make up for the data deficit resulting from displaying the data with the aspect ratio of 4:3 on the widescreen.

That is, the position setting circuit 46 transmits to counter 42 write position setting data which will cause the component data with the bit rate of 27 MB/10 bits to be written in a mid region of the line memory 42.

Responsive to the component data of 27 MHz/10 bits from S/P converter 41 and the write position setting data, counter 42 controls the write position of the component data of 27 MHz/10 bits supplied to line memory 42.

In this manner, the component data of 27 MHz/10 bits having the aspect ratio of 4:3 is written in the mid region of line memory 42.

The position setting circuit 46 transmits to counter 42 read position setting data which will cause data to be read out from the end of line memory 42.

Responsive to the component data of 27 MB/10 bits from S/P converter 41 and the read position setting data, counter 42 controls the read position of line memory 42.

In this manner, the component data of 27 MHz/10 bits having the aspect ratio of 4:3 are written in the mid region of the line memory 42 having a storage area in which the data for widescreen having the aspect ratio of 16:9 can be written. Consequently, the component data of 27 MHz/10 bits for widescreen, to which the black screen area corresponding to the above-mentioned data deficit is annexed at both ends of the picture having the aspect ratio of 4:3 can be read by reading data from the end of line memory 42.

The component data of 27 MHz/10 bits for widescreen, read from line memory 42, are supplied to P/S converter 43.

The P/S converter 43 converts the component data of 27 MHz/10 bits, which are parallel data, into serial data with 270 MB/sec, which are outputted via output terminal 44.

The component data or widescreen with the bit rate of 270 MB/sec, outputted via output terminal 44, are supplied to routing switch 4.

Routing switch 4 transmits the component data for widescreen with 270 MB/sec, which are serial data, to VTR handling the component data for widescreen with the bit rate of 270 MB/sec, for recording/reproduction.

The manner in which the playback data from the D2VTR provided in the second recording/reproducing unit 2 for handling component data of the bit rate of 143 MB/sec for handling widescreen component data is now supplied to D1VTR is explained.

The 143 MB/sec component data outputted via a serial interface, not shown, from the VTR handling component data with the bit rate of 143 MB/sec, is supplied to routing switch 4.

The routing switch 4 transmits the 143 MB/sec component data to first bit rate converting circuit 10 in the bit rate converter 5 shown in FIG. 2.

Using bit expander BEP, the first bit rate converting circuit 10 converts the component data with the bit rate of 143 MB/sec into component data with the bit rate of 270 MB/sec, as shown in FIG. 3c.

Figure 6:
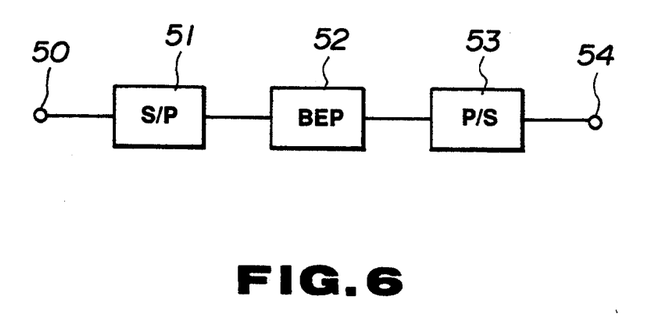
FIG. 6 is a block diagram showing BEP provided in the bit rate converter.

The BEP is made up of an S/P converting circuit 51, BEP 52 and a P/S converting circuit 53, as shown for example in FIG. 6.

The component data having the bit rate of 143 MB/sec is first supplied via input terminal 50 to S/P converting circuit 51. S/P converter 51 converts the 143 MB/sec component data, which are supplied as serial data, into parallel data with 14.3 MHz/10 bits, which is supplied to BEP 52.

The BEP 52 effects a bit-increasing operation of arranging the component data with the bit rate of 14.3 MHz/10 bits into component data with the bit rate of 27 MHz/10 bits which are supplied to P/S converting circuit 53.

P/S converting circuit 53 converts the component data with the bit rate of 27 MHz/10 bits into 270 MB/sec bit rate serial data which is outputted via output terminal 54. The 270 MB/sec component data, outputted via output terminal 54, is supplied to routing switch 4.

Routing switch 4 transmits the component data of 27 MHz/10 bits to D1VTR.

In this manner, the playback data from VTR handling the 143 MB/sec component data may be recorded and/or reproduced by D1VTR.

The manner in which playback data from VTR provided in the second recording/reproducing unit 2 for handling the 143 MB/sec component data is supplied to VTR provided in the first recording/reproducing unit 1 for handling the 270 MB/sec component data for widescreen is now explained.

The 143 MB/sec component data outputted via serial interface from VTR handling the 143 MB/sec bit rate component data is supplied to routing switch 4.

Routing switch 4 transmits the 143 MB/sec bit rate component data to first bit rate converting circuit 10 in the bit rate converter 5 shown in FIG. 2.

Using BEP and ADD, the first bit rate converting circuit 10 converts the 143 MB/sec bit rate component data into component data for widescreen with bit rate of 2.70 MB/sec, as shown in FIG. 3d.

ADD and BEP are arranged in the same manner as shown in FIGS. 5 and 6 so that the 143 MB/sec bit rate component data supplied to first bit rate converting circuit 10 are processed by BEP shown in FIG. 6 by the above-described bit number increasing operation into 270 MB/sec component data, which is supplied to ADD.

The ADD writes the 270 MB/sec component data in the mid region of line memory 42 to read out data from the end for converting the 270 MB/sec component data into 270 MB/sec output widescreen component data.

In this manner, the first bit rate converting circuit 10 converts the 143 MB/sec component data into 270 MB/sec component data for widescreen which 270 MB/sec component data is supplied to routing switch 4.

Routing switch 4 transmits the 270 MB/sec component data for widescreen to VTR handling the 270 MB/sec widescreen component data.

In this manner, the playback data from VTR provided in the second recording/reproducing unit 2 for handling the 143 MB/sec component data may be recorded and/or reproduced by VTR provided in the first recording/reproducing unit 1 for handling the 270 MB/sec widescreen component data.

The manner in which playback data from D2VTR provided in the second recording/reproducing unit 2 for handling the 143 MB/sc component data for widescreen is supplied to D1VTR provided in the first recording/reproducing unit 1 for handling 270 MB/sec component data is now explained.

The 143 MB/sec component data for widescreen, outputted via serial interface from VTR handling the 143 MB/sec bit rate component data for widescreen, is supplied to routing switch 4.

Routing switch 4 transmits the 143 MB/sec component data for widescreen to first bit rate converting circuit 10 in the bit rate converter 5 shown in FIG. 2.

Using BEP and MSK, the first bit rate converting circuit 10 converts the 143 MB/sec component data for widescreen into 270 MB/sec bit rate component data, as shown in FIG. 3e.

The bit expander BEP has a circuit arrangement similar to that shown in FIG. 6, while the masking circuit (MSK) has a circuit arrangement similar to that shown and described as ADD in FIG. 5.

Meanwhile, if the circuit shown in FIG. 5 is used as ADD, the 270 MB/sc component data is converted into 270 MB/sec component data for widescreen by writing the component data with bit rate of 270 MHz/10 bits in the mid region of the line memory 42 and reading the data from the end of line memory 42 during readout. If the circuit shown in FIG. 5 is used as MSK, the component data with 27 MHz/10 bits for widescreen is written in line memory to its full capacity and data of the data region with the aspect ratio of 4:3, which is the above-mentioned mid region, is read during readout.

That is, the 143 MB/sc component data for widescreen, supplied to the first bit rate converting circuit 10, is processed by BEP shown in FIG. 6 by the above-mentioned bit number increasing operation for being converted into 270 MB/sec component data for widescreen, which 270 MB/sec component data for widescreen is supplied to MSK shown in FIG. 5.

The 270 MB/sec component data for widescreen supplied to MSK shown in FIG. 5 is converted by S/P converting circuit 41 into parallel data of 27 MHz/10 bits which are transmitted to line memory 42 and counter 45.

The position setting circuit 46 supplies the write position setting data to counter 45 which will cause the component data of 27 MHz/10 bits supplied to line memory 42 to be written in line memory 42 to its full capacity.

Responsive to the component data for widescreen with the 27 MHz/10 bits, supplied from S/P converting circuit 41, and the above-mentioned write position setting data, counter 45 controls the writing position of the component data for widescreen with the bit rate of 27 MHz/10 bits supplied to line memory 42.

In this manner, the component data for widescreen with the bit rate of 27 MHz/10 bits is written in line memory 42 to its full capacity.

Read position setting data, by which the component data for widescreen with the bit rate of 27 MHz/10 bits, written in line memory 42 to its full capacity, is read only from the mid region of the line memory 42 in which the component data of the bit rate of 27 MHz/10 bits, which are the data with the aspect ratio of 4:3, are written, is supplied to counter 45.

Responsive to the component data for widescreen with the bit rate of 27 MHz/10 bits, supplied from S/P converting circuit 41, and the position setting data, counter 45 controls the reading position so that only data written in the mid region of line memory 42 is read out.

In this manner, the component data with the bit rate of 27 MHz/10 bits having the aspect ratio of 4:3 is read out from line memory 42.

The component data with 27 MHz/10 bits is converted by P/S converting circuit 43 into 270 MB/sec output component data.

In this manner, the first bit rate converting circuit 10 converts the 143 MB/sec component data for widescreen into 270 MB/sec component data which are the data with the aspect ratio of 4:3. These 270 MB/sec component data are supplied to routing switch 4.

Routing switch 4 transmits the 270 MB/sec component data to D1VTR provided in the first recording/reproducing unit 1.

In this manner, playback data from the VTR provided in the second recording/reproducing unit 2 for handling the 143 MB/sec component data for widescreen may be recorded and/or reproduced in D1VTR provided in the first recording/reproducing unit 1.

The manner in which playback data from the VTR provided n the second recording/reproducing unit 2 for handling 143 MB/sec component data for widescreen is supplied to the VTR provided in the first recording/reproducing unit 1 for handling the 270 MB/sec component data for widescreen is now explained.

The 143 MB/sec component data for widescreen, outputted via serial interface from the VTR handling the 143 MB/sec bit rate component data for widescreen, is supplied to routing switch 4.

Routing switch 4 transmits the 143 MB/sec component data for widescreen to first bit rate converting circuit 10 of the bit rate converter 5 shown in FIG. 2.

Using BP, the first bit rate converting circuit 10 converts the 143 MB/sec component data for widescreen into 270 MB/sec component data for widescreen, as shown in FIG. 3f.

BEP has a circuit arrangement similar to that shown in FIG. 6. The bit rate converting circuit 10 first transmits the 143 MB/sec component data for widescreen to S/P converting circuit 51 via input terminal 50.

The S/P converting circuit 51 converts the 143 MB/sec component data for widescreen supplied as serial data into parallel data having the bit rate of 14.3 MHz/10 bits, which parallel data is supplied to BEP 52.

BEP 52 effects a bit number increasing operation on the component data for widescreen with the bit rate of 14.3 MHz/10 bits as described above, for generating widescreen component data having the bit rate of 27 MHz/10 bits, which data is supplied to P/S converting circuit 53.

The P/S converting circuit 53 converts the component data for widescreen having the bit rate of 27 MHz/10 bits, as the above-mentioned parallel data, into 270 MB/sec serial data, which are outputted via output terminal 54.

The first bit converting circuit 10 converts the 143 MB/sec widescreen component data into 270 MB/sec widescreen component data.

In this manner, the 270 MB/sc component data for widescreen, converted into the serial data as described above, is supplied to routing switch 4.

The routing switch 4 then transmits the 270 MB/sec component data for widescreen to the VTR provided in the first recording/reproducing unit 1 for handling the 270 MB/sec widescreen component data.

In this manner, playback data from the VTR provided in the second recording/reproducing unit 2 for handling the 143 MB/sec widescreen component data may be recorded and/or reproduced by the VTR provided in the first recording/reproducing unit 1 for handling the 270 MB/sec widescreen component data.

The manner in which playback data from D2VTR provided in the second recording/reproducing unit 2 for handling 143 MB/sec composite data is now supplied to a widescreen VTR provided in the third recording/reproducing unit 3 for handling 360 MB/sec widescreen component data is now explained.

In this case, 143 MB/sec composite data outputted via serial interface from D2VTR is supplied to routing switch 4.

Routing switch 4 transmits the 143 MB/sec composite data to the second bit rate converting circuit 11 in the bit rate converter 5 shown in FIG. 2.

As described previously, D2VTR handles the 143 MB/sec bit rate composite data, whereas the widescreen VTR handles the 360 MB/sec bit rate widescreen component data.

Thus, using DEC, RC and ADD, the second bit rate converting circuit 11 converts the 143 MB/sec bit rate composite data for widescreen into 360 MB/sec bit rate component data for widescreen, as shown in FIG. 3g.

The DEC and RC are arranged in the same manner as DEC 23 and RC 24 shown in FIG. 4, whereas the ADD is arranged in the same manner as the ADD shown in FIG. 5.

The 143 MB/sec composite data supplied from routing switch 4 to second bit rate converting circuit 11 is first supplied via input terminal 20 to S/P converting circuit 21.

The S/P converting circuit 21 converts the 143 MB/sec composite data, supplied as serial data, into parallel data with 14.3 MHz/ 10 bits which are supplied to Y/C separating circuit 22.

The Y/C separating circuit 22 separates the composite data with 14.3 MHz/10 bits, converted into the parallel data, into luminance data Y and first and second chroma data $C_I$ and $C_Q$, which are supplied to DEC 23.

The DEC 23 converts the luminance data Y and first and second chroma data $C_I$ and $C_Q$ as the composite data into luminance data Y and first and second chroma data $C_1$ and $C_2$ as composite data and transmits the luminance data Y to RC circuit 24a for Y in RC 24, while transmitting the first and second chroma data $C_1$ and $C_2$ to RC circuit 24b for $C_1$ and to RC circuit 24c for $C_2$, respectively.

The RC circuit 24a for Y generates luminance data with 18 MHz/10 bits by sampling rate conversion of the luminance data Y having the bit rate of 14.3 MHz/10 bits.

On the other hand, the RC circuit 24b for $C_1$ and the RC circuit 24c for $C_2$ generate first and second chroma data $C_1$ and $C_2$, each having the bit rate of 9 MHz/10 bits, by sampling rate conversion of the first and second chroma data $C_1$ and $C_2$ each having the bit rate of 14.3 MHz/10 bits.

The luminance data with 18 MHz/10 bits, generated by RC circuit 24a for Y, and the first and second chroma data $C_1$ and $C_2$, each with the bit rate of 9 MHz/10 bits, generated by the RC circuit 24b for $C_1$ and RC circuit 24c for $C_2$, are supplied to ENC 25.

ENC 25 rearrays the luminance data Y and the chroma data $C_1$ and $C_2$ into chronological parallel data to generate component data with 36 MHz/10 bits which are supplied to parallel/serial (P/S) converting circuit 26.

The P/S converting circuit 26 converts the component data with 36 MHZ/0 bits, which are parallel data, into 360 MB/sec serial data, which are outputted via output terminal 27.

The 360 MB/sec component data are then supplied to ADD shown in FIG. 5.

That is, the 360 MB/sec component data, supplied to ADD, is first supplied via input terminal 41 to S/P converting circuit 41.

The S/P converting circuit 41 converts the 360 MB/sec component data into parallel data with 36 MHz/10 bits which are supplied to line memory 42 and to counter 45.

It is noted that, since the component data with 36 MHz/10 bits are the data with the aspect ratio of 4:3, it has to be converted into data for widescreen having the aspect ratio of 16:9.

Consequently, the position setting circuit 46 causes the component data with the 36 MHz/10 bits to be written in the mid region of the line memory 42, while transmitting to counter 45 the write position setting data and read position setting data causing data to be read out from the end of line memory 42 during reading.

Responsive to the component data with the 36 MHz/10 bits supplied from S/P converting circuit 41 and to the above-mentioned write position setting data or reading position setting data, counter 45 controls data reading and writing in and from line memory 42.

In this manner, the component data with 36 MHz/10 bits, having the aspect ratio of 4:3, may be converted into component data for widescreen with 36 MHz/10 bits having the aspect ratio of 16:9. The component data for widescreen with 36 MHz/10 bits is supplied to P/S converting circuit 43.

The P/S converting circuit 43 converts the parallel component data for widescreen with 36 MHz/10 bits into serial data to generate 360 MB/sec composite data for widescreen which are supplied to routing switch 4.

The routing switch 4 transmits the 360 MB/sec component data for widescreen to wide screen VTR provided in the third recording/reproducing unit 3.

In this manner, the 143 MB/sec composite data from D2VTR provided in the second recording/reproducing unit 2 may be recorded and/or reproduced in the widescreen VTR provided in the third recording /reproducing unit 3 for handling the 360 MB/sec component data.

The manner in which the component data outputted via serial interface from the VTR provided in the second recording/reproducing unit 2 for handling the 143 MB/sec component data is supplied to the widescreen VTR provided in the third recording/reproducing unit 3 for handling 360 MB/sec bit rate component data is explained.

In this case, the 143 MB/sec component data is supplied to routing switch 4.

The routing switch 4 transmits the 143 MB/sec component data to second bit rate converting circuit 11 within the bit rate converter 5 shown in FIG. 2.

Using BEP, RC and ADD, the second bit rate converting circuit 11 converts the 143 MB/sec component data into 360 MB/sec component data for widescreen, as shown in FIG. 3h.

That is, the 143 MB/sec component data, supplied to second bit rate converting circuit 11, is first supplied via input terminal 50 shown in FIG. 6 to S/P converting circuit 51.

The S/P converting circuit 51 transmits the 143 MB/sec component data, supplied as serial data, into parallel data with 14.3 MHz/10 bits, which are supplied to BEP 52.

It is noted that, if the 14.3 MB/sec component data, which are data for aspect ratio of 4:3, are subsequently converted by ADD into data with the aspect ratio of 16:9, the number of bits is reduced. Consequently, the component data with 14.3 MHz/10 bits is processed with bit number increasing operation, so that the number of bits is not reduced after conversion into data having the aspect ratio of 16:9, and the resulting data is supplied to P/S converting circuit 53.

The P/S converting circuit 53 converts the 143 MB/sec component data, processed with the bit number increasing operation, into 143 MB/sec serial data, which is outputted at output terminal 54.

The 143 MB/sc component data, outputted via output terminal 54 from P/S converting circuit 53, is supplied to RC circuit 24 explained in connection with FIG. 4 for being rate converted from the bit rate of 143 MB/sec into 360 MB/sec. The rate-converted 360 MB/sec component data are supplied to ADD shown in FIG. 5.

Since the 360 MB/sec component data are data for the aspect ratio of 4:3, the ADD appends the above-mentioned deficit data to the 360 MB/sec component data to generate the 360 MB/sec bit rate widescreen component data which is outputted.

The 360 MB/sec component data for widescreen is supplied via routing switch 4 to widescreen VTR provided in the third recording/reproducing unit 3.

In this manner, the playback data from the VTR provided in the second recording/reproducing unit 2 for handling the 143 MB/sec bit rate component data may be recorded and/or reproduced by the widescreen VTR provided in the third recording/reproducing unit 3 for handling the 360 MB/sec bit rate component data.

The manner in which playback data from the VTR provided in the second recording/reproducing unit 2 for handling the 143 MB/sec component data for widescreen is supplied to the widescreen VTR provided in the third recording/reproducing unit 3 for handling 360 MB/sec widescreen component data is now explained.

In this case, the 143 MB/sec component data, outputted via serial interface from the VTR handling component data for widescreen with the 143 MB/sec bit rate, is supplied to routing switch 4.

The routing switch 4 transmits the 143 MB/sec component data for widescreen to second bit rate converting circuit 11 in the bit rate converter 5.

Using BEP, the second bit rate converting circuit 11 converts the 143 MB/sec component data for widescreen into 360 MB/sec component data for widescreen, as shown in FIG. 3i.

That is, the 143 MB/sec component data for widescreen, supplied to the second bit rate converting circuit 11, is processed by BEP arranged similarly to BEP 52 shown in FIG. 6, with a bit number increasing operation so that the bit rate is 360 MB/sec before being supplied to routing switch 4.

The routing switch 4 transmits the 360 MB/sec component data for widescreen, processed with the bit number increasing operation, to the widescreen VTR provided in the third recording/reproducing unit 3.

In this manner, playback data from VTR provided in the second recording/reproducing unit 2 for handling 143 MB/sec bit rate component data for widescreen may be recorded and/or reproduced by the widescreen VTR provided in the third recording/reproducing unit 3.

The manner in which playback data from D1VTR of the first recording/reproducing unit 1 for handling 270 MB/sec component data is supplied to D2 VTR of the second recording/reproducing unit 2 for handling 143 MB/sec composite data is now explained.

In this case, the 270 MB/sec component data outputted from D1VTR via serial interface is supplied to routing switch 4.

The routing switch 4 transmits the 270 MB/sc component data to first bit converting circuit 10 in the bit rate converter 5.

Using ENC and RC, the first bit rate converting circuit 10 converts the 270 MB/sec component data into 143 MB/sec composite data, as shown in FIG. 3j.

Figure 7:
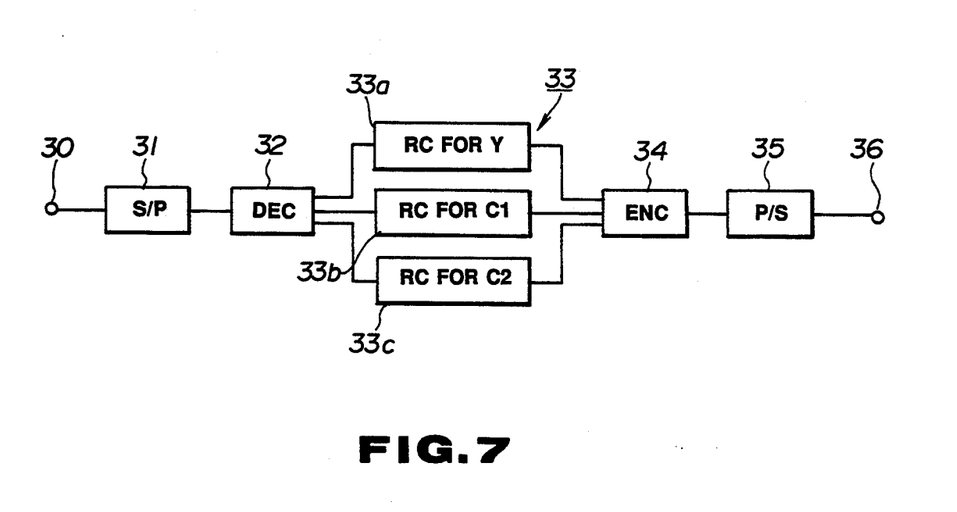
FIG. 7 is a block diagram showing RC and ENC provided in the bit rate converter.

That is, the 270 MB/sec component data, supplied to the first bit rate converting circuit 10, is supplied to S/P converting circuit 31 via input terminal 30 shown in FIG. 7.

The S/P converting circuit 31 converts the 270 MB/sec component data, supplied as serial data, into parallel data of 27 MHz/10 bits, which are supplied to DEC 32.

The DEC 32 separates the component data of 27 MHz/10 bits into luminance data Y and first and second chroma data $C_1$ and $C_2$ which are supplied to RC 33a for Y, RC 33b for $C_1$ and RC 33c for $C_2$ in RC 33, respectively.

The RC 33a for Y, RC 33b for $C_1$ and RC 33c for $C_2$ convert the luminance data Y, first and second chroma data $C_1$ and $C_2$, which are component data with the bit rate of 27 MHz/10 bits, into luminance data Y, first chroma data $C_1$ and second chroma data $C_2$, each having the bit rate of 14.3 MHz/10 bits, respectively, which are supplied to ENC 34.

The ENC 34 converts the luminance data Y, first chroma data $C_1$ and second chroma data $C_2$ of 14.3 MHz/10 bits into composite data which are supplied to P/S converting circuit 35.

The P/S converting circuit 35 converts the parallel composite data of 14.3 MHz/10 bits into 143 MB/sec output serial data.

The 14.3 MB/sec composite data, converted into the above serial data, is supplied to routing switch 4.

The routing switch 4 supplies the 143 MB/sec composite data to D2VTR provided in the second recording/reproducing unit 1.

In this manner, the playback data from D1VTR of the first recording/reproducing unit 1 may be recorded and/or reproduced in D2VTR of the second recording/reproducing unit 2.

The manner in which the playback data from D1VTR provided in the first recording/reproducing unit 1 for handling 270 MB/sec component data is supplied to VTR provided in the second recording/reproducing unit 2 for handling the 143 MB/sec component data is now explained.

In this case, the 270 MB/sec component data, outputted via serial interface from D1VTR, is supplied to routing switch 4. The routing switch 4 transmits the 270 MB/sec component data to first bit rate converting circuit 10 within the bit rate converter 5.

Using BRD, the first bit rate converting circuit 10 converts the 270 MB/sec component data into 143 MB/sec component data, as shown in FIG. 3k.

Figure 8:
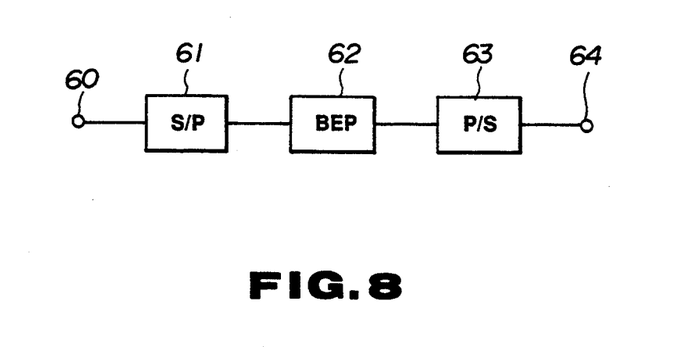
FIG. 8 is a block diagram showing EP provided in the bit rate converter.

That is, the 270 MB/sec component data supplied to first bit rate converting circuit 10 is supplied to S/P converting circuit via input terminal 60 shown in FIG. 8.

The S/P converting circuit 61 converts the 270 MB/sec component data supplied as serial data into parallel data with 27 MHz/10 bits which is supplied to BRD 62.

The component data of 27 MHz/10 bits is processed by BRD 62 with the operation of bit reduction to generate component data of 14.3 MHZ/0 bits which are supplied to P/S converting circuit 63.

The P/S converting circuit 63 converts the 14.3 NHz/10 bits supplied as parallel data into 143 MB sec serial data which is outputted via output terminal 64.

The 143 MB/sec component data is supplied via routing switch 4 to VTR provided in the second recording/reproducing unit 2 for handling the 143 MB/sec component data.

In this manner, the 270 MB/sec component data outputted via serial interface from D1VTR provided in the first recording/reproducing unit 1 may be recorded and/or reproduced in VTR provided in the second recording/reproducing unit 2 for handling the 143 MB/sec component data.

The manner in which playback data from D1VTR provided in the first recording/reproducing unit 1 for handling 270 MB/sec bit rate component data is supplied to VTR provided in the second recording/reproducing unit 2 for handling the 143 MB/sec bit rate component data for widescreen is now explained.

In this case, the 270 MB/sec component data outputted from D1VTR via serial interface is supplied to routing switch 4.

The routing switch 4 transmits the 270 MB/sec component data to first bit rate converting circuit 10 in the bit rate converting circuit 5.

Using BRD and ADD, the first bit rate converting circuit 10 converts the 270 MB/sec component data into 143 MB/sec component data for widescreen, as shown in FIG. 3.

That is, the 270 MB/sec component data supplied to first bit rate converting circuit 10 is first supplied to S/P converting circuit 61 via input terminal 60 shown in FIG. 8.

The S/P converting circuit 61 converts the 270 MB/sec component supplied as serial data into parallel data with 27 MHz/10 bits which is transmitted to BRD 62.

The component data of 27 MHz/10 bits is processed with the operation of bit reduction by BRD 62 into component data with 14.3 MHz/10 bits which are supplied to P/S converting circuit 63.

The P/S converting circuit 63 converts the parallel component data of 14.3 MHz/10 bits into 143 MB/sec serial data which are outputted via output terminal 64.

The 143 MB/sec component data outputted via output terminal 64 is supplied to S/P converting circuit 61 via input terminal 60 shown in FIG. 5.

The S/P converting circuit 61 converts the 14.3 MB/sec component data supplied as serial data into parallel data of 14.3 MHz/10 bits which are supplied to line memory 42 and counter 45.

The component data of 14.3 MHz/10 bits are data with the aspect ratio of 4:3 . Thus the position setting circuit 46 transmits to counter 45 the write position setting data of writing the component data of 14.3 MHz/10 bits in the mid position of line memory 42 and readout position setting data of reading out data from the end of line memory 42.

The counter 45 controls data writing and readout to and from line memory 42 responsive to the component data of 14.3 MHz/10 bits from S/P converting circuit 41 and writing and readout position setting data from the position setting circuit 46.

In this manner, the component data with 14.3 MHz/10 bits is converted into output widescreen component data with 14.3 MHz/10 bits.

The component data for widescreen with 14.3 MHz/10 bits, which are parallel data read out from line memory 42, is supplied to P/S converting circuit 43.

The P/S converting circuit 43 converts the component data for widescreen with 14.3 MHz/10 bits, which are the above parallel data, into 143 MB/sec serial data, which are outputted via output terminal 44.

The 143 MB/sec widescreen component data, outputted via output terminal 44, is supplied via routing switch 4 to VTR provided in the second recording/reproducing unit 2 for handling the 143 MB/sec widescreen component data.

In this manner, the 270 MB/sec component data from D1VTR provided in the first recording/reproducing unit 1 may be recorded and/or reproduced by D1VTR provided in second recording/reproducing unit 2 for handling the 143 MB/sec widescreen component data.

The manner in which playback data from the VTR provided in the first recording/reproducing unit 1 for handling the 270 MB/sec widescreen component data is supplied to D2VTR provided in the second recording/reproducing unit 2 for handling 143 MB/sec component data is now explained.

In this case, the 270 MB/sec widescreen component data outputted via serial interface from VTR handling the 270 MB/sec component data for widescreen is supplied to routing switch 4.

The 270 MB/sec widescreen component data is supplied by routing switch 4 to first bit rate converting circuit 10 in the bit rate converting circuit 5.

Using RC, ENC and MSK, the first bit rate converting circuit 10 converts the 270 MB/sec widescreen component data into 143 MB/sec composite data, as shown in FIG. 3m.

That is, the 270 MB/sec widescreen component data supplied to the first bit rate converting circuit 10 is first supplied to S/P converting circuit 31 via an input terminal 30 shown in FIG. 7.

The S/P converting circuit 31 converts the 270 MB/sec widescreen component data supplied as serial data into parallel data of 27 MHz/10 bits which are supplied to DEC 32.

The DEC 32 separate the widescreen component data of 27 MHz/10 bits into luminance data Y, first chroma data $C_1$ and second chroma data $C_2$ which are supplied to the RC 33a for Y, RC 33b for $C_1$ and RC 33c for $C_2$ in RC 33, respectively.

The RC 33a for Y, RC 33b for $C_1$ and RC 33c for $C_2$ convert the luminance data Y, first and second chroma data $C_1$ and $C_2$, which are widescreen component data with the bit rate of 27 MHz/10 bits, into luminance data Y, first chroma data $C_1$ and second chroma data $C_2$, which are widescreen component data each having the bit rate of 14.3 MHz/10 bits, respectively, and which are supplied to ENC 34.

The ENC 34 converts the luminance data Y, first chroma data $C_1$ and second chroma data $C_2$, which are widescreen component data of 14.3 MHz/10 bits, into composite data, which are supplied to P/S converting circuit 35.

The P/S converting circuit 35 converts the parallel composite widescreen data of 14.3 MHz/10 bits into 143 MB/sec output serial data which are outputted via output terminal 36.

The 143 MB/sec widescreen composite data outputted via output terminal 36 is supplied via input terminal 40 of MSK shown in FIG. 5 to S/P converting circuit 41.

The S/P converting circuit 41 converts the 143 MB/sec widescreen composite data, supplied as the serial data, into parallel data of 143 MHz/10 bits, which are supplied to line memory 42 and to counter 45.

It is noted that the composite data for widescreen with 14.3 MHz/10 bits are data with the aspect ratio of 16:9. Thus the position setting circuit 46 transmits to counter 45 write position setting data for writing the widescreen composite data with 14.3 MHz/10 bits in line memory 42 to its full capacity and readout position setting data for reading out data from the mid position of line memory 42 corresponding to the aspect ratio of 4:3.

Responsive to the composite data for widescreen with 14.3 MHz/10 bits from S/P converting circuit 41, the write position setting data and the readout position setting data from position setting circuit 46, the counter 45 controls data writing and readout in and from line memory 42.

In this manner, the composite data for widescreen with the bit rate of 14.3 MHz/10 bits is converted into composite data having the bit rate of 14.3 MHz/10 bits, which are outputted.

The composite data with 14.3 MHz/10 bits, which are parallel data rad out from line memory 42, is supplied to P/S converting circuit 43.

The P/S converting circuit 43 converts the composite data with 14.3 MHz/10 bits, which are the above parallel data, into 143 MB/sec serial data, which are outputted via output terminal 44.

The 143 MB/sec composite data, outputted via output terminal 44, is supplied via routing switch 4 to D2VTR provided in the second recording/reproducing unit 2.

In this manner, the playback data from VTR provided in the first recording/reproducing unit 1 for handling the 270 MB/sec widescreen component data may be recorded and/or reproduced by D2VTR provided in the second recording/reproducing unit 2.

The manner in which playback data from the D1VTR provided in the first recording/reproducing unit 1 for handling the 270 MB/sec widescreen component data is supplied to VTR provided in the second recording/reproducing unit 2 for handling 143 MB/sec component data is now explained.

In this case, the 270 MB/sec widescreen component data outputted via serial interface from VTR handling the 270 MB/sec component data for widescreen is supplied to routing switch 4.

The 270 MB/sec widescreen component data is supplied by routing switch 4 to first bit rate converting circuit 10 in the bit rate converter 5.

Using BRD and MSK, the first bit rate converting circuit 10 converts the 270 MB/sec widescreen component data into 143 MB/sec composite data, as shown in FIG. 3n.

That is, if the 270 MB/sec widescreen component data supplied to the first bit rate converting circuit 10, which is the data having the aspect ratio of 16:9, is subsequently converted by MSK into 143 MB/sec component data having the aspect ratio of 4:3, the number of bits is increased so that the data is not matched to the bit rate of 143 MB/sec. Thus the 270 MB/sec widescreen component data is processed before being supplied to MSK shown in FIG. 5 with the operation of bit reduction by BRD so that the number of bits is not subsequently increased.

By reading out data of the region corresponding to the aspect ratio of 4:3 from the 270 MB/sec widescreen component data written in line memory 42 and processed by the bit number reducing operation, the MSK converts the 270 MB/sec component data for widescreen into 143 MB/sec component data which are supplied to routing switch 4.

The routing switch 4 transmits the 143 MB/sec component data to VTR provided in the second recording/reproducing unit 2 for handling the 143 MB/sec component data.

In this manner, the playback data from VTR provided in the first recording/reproducing unit 1 for handling the 270 MB/sec widescreen component data may be recorded and/or reproduced by VTR provided in the second recording/reproducing unit 2 for handling 143 MB/sec component data.

The manner in which playback data from the VTR provided in the first recording/reproducing unit 1 for handling the 270 MB/sec widescreen component data is supplied to VTR provided in the second recording/reproducing unit 2 for handling 143 MB/sec widescreen component data is now explained.

In this case, the 270 MB/sec widescreen component data outputted via serial interface from VTR handling the 270 MB/sec component data for widescreen is supplied to routing switch 4.

The 270 MB/sec widescreen component data is supplied by routing switch 4 to first bit rate converting circuit 10 in the bit rate converting circuit 5.

Using BRD, the first bit rate converting circuit 10 converts the 270 MB/sec widescreen component data into 143 MB/sec composite data, as shown in FIG. 3o.

That is, the 270 MB/sec component data for widescreen is processed by BRD 62 shown in FIG. 8 with a bit number reducing operation for being converted into 143 MB/sec component data for widescreen which is supplied to routing switch 4.

The routing switch 4 transmits the 143 MB/sec widescreen component data to VTR provided in the second recording/reproducing unit 2 for handling 143 MB/sec widescreen component data.

In this manner, the playback data from VTR provided in the second recording/reproducing unit 2 for handling the 270 MB/sec widescreen component data may be recorded and/or reproduced by VTR provided in the first recording/reproducing unit 1 for handling 143 MB/sec widescreen component data.

The manner in which playback data from the D1VTR provided in the first recording/reproducing unit 1 for handling the 270 MB/sec component data is supplied to a widescreen VTR provided in the third recording/reproducing unit 3 for handling 360 MB/sec widescreen component data is now explained.

In this case, the 270 MB/sec component data outputted from D1VTR via serial interface is similarly supplied to routing switch 4.

The routing switch 4 transmits the 270 MB/sec component data to third bit rate converting circuit 12 within the bit rate converter 5.

Using ADD, the third bit rate converting circuit 12 converts the 270 MB/sec component data into 360 MB/sec widescreen component data, as shown in FIG. 3p.

That is, the 270 MB/sec component data, which is the data with the aspect ratio of 4:3, is converted by ADD shown in FIG. 5 into 360 MB/sec bit rate widescreen component data with the aspect ratio of 16:9, which are supplied to routing switch 4.

The routing switch 4 transmits the 360 MB/sec widescreen component data to widescreen VTR provided in the third recording/reproducing unit 3 for handling the 360 MB/sec widescreen component data.

In this manner, the playback data from D1VTR provided in the first recording/reproducing unit 1 for handling the 270 MB/sec component data may be recorded and/or reproduced by widescreen VTR provided in the third recording reproducing unit 3 for handling 360 MB/sec widescreen component data.

The manner in which playback data from the VTR provided in the first recording/reproducing unit 1 for handling the 270 MB/sec widescreen component data is supplied to widescreen VTR provided in the third recording/reproducing unit 3 for handling 360 MB/sec widescreen component data is now explained.

In this case, the 270 MB/sec widescreen component data outputted via serial interface from VTR handling the 270 MB/sec widescreen component data is similarly supplied to routing switch 4.

The routing switch 4 transmits the 270 MB/sec widescreen component data to third bit rate converting circuit 12 in the bit rate converter 5.

By the bit number increasing operation by BEP, the third bit rate converting circuit 12 converts the 270 MB/sec widescreen component data into 360 MB/sec widescreen component data, as shown in FIG. 3q. The 360 MB/sec widescreen component data is supplied via routing switch 4 to widescreen VTR provided in the third recording/reproducing unit 3.

In this manner, the playback data from VTR provided in the first recording/reproducing unit 1 for handling the widescreen 270 MB/sec component data may be recorded and/or reproduced by widescreen VTR provided in the third recording/reproducing unit 3 for handling 360 MB/sec widescreen component data.

The manner in which 360 MB/sec bit rate widescreen component data from widescreen VTR provided in the third recording/reproducing unit 3 is supplied to D2VTR provided in the second recording/reproducing unit 2 for recording and/or reproducing 143 MB/sec composite data is now explained.

In this case, the 360 MB/sec widescreen component data outputted from widescreen VTR via serial interface is supplied to routing switch 4.

The routing switch 4 transmits the 360 MB/sec widescreen component data to second bit rate converting circuit 11 provided in the bit rate converter 5.

Using RC, ENC and MSK, the second bit rate converter 11 converts the 360 MB/sec widescreen component data into 143 MB/sec composite data, as shown in FIG. 3r.

That is, the 360 MB/sec widescreen component data is converted by RC 33 and ENC 34 into 143 MB/sec bit rate widescreen composite data, as shown in FIG. 7.

The 143 MB/sec widescreen composite data, which is the data having the aspect ratio of 16:9, is converted by MSK shown in FIG. 5 into 143 MB/sec composite data having the aspect ratio of 4:3, which composite data is supplied to routing switch 4.

The routing switch 4 transmits the 143 MB/sec composite data to D2VTR provided in the second recording/reproducing unit 2.

In this manner, playback data from widescreen VTR provided in the third recording/reproducing unit 3 for handling 360 MB/sec widescreen component data may be recorded and/or reproduced by D2VTR provided in the second recording/reproducing unit 2 for handling 143 MB/sec composite data.

The manner in which playback data from widescreen VTR provided in the third recording/reproducing unit 3 for handling 360 MB/sec widescreen component data is supplied to VTR provided in the second recording-/reproducing unit 2 for handling 143 MB/sec component data is now explained.

In this case, the 360 MB/sec widescreen component data outputted from widescreen VTR via serial interface is supplied to routing switch 4.

The routing switch 4 transmits the 360 MB/sec widescreen component data to second bit rate converting circuit 11 in the bit rate converter 5.

Using BRD, RC and MSK, the second bit rate converting circuit 11 converts the 360 MB/sec widescreen component data into 143 MB/sec component data, as shown in FIG. 3s.

That is, if the 360 MB/sec widescreen component data, having the aspect ratio of 16:9, is subsequently converted by MSK into 143 MB/sec component data having the aspect ratio of 4:3, the number of bits is increased. For this reason, the 360 MB/sec widescreen component data is processed by BRD shown in FIG. 8 by a bit number reducing operation before being supplied to RC.

The RC converts the bit rate of the 360 MB/sec widescreen component data, processed by the bit number reducing operation as described above, from 360 MB/sec to 143 MB/sec, and transmits the resulting signals to MSK shown in FIG. 5.

By reading data in the region corresponding to the aspect ratio of 4:3 from the 143 MB/sec widescreen data written in line memory 42, the MSK converts the 143 MB/sec widescreen component data into 143 MB/sec component data, which is supplied to routing switch 4.

The routing switch 4 transmits the 143 MB/sec component data to VTR provided in the second recording-/reproducing unit 2 for handling the 143 MB/sec component data.

In this manner, playback data from widescreen VTR provided in the third recording/reproducing unit 3 for handling 360 MB/sec widescreen component data may be recorded and/or reproduced by VTR provided in the second recording/reproducing unit 2 for handling 143 MB/sec composite data.

The manner in which playback data from widescreen VTR provided in the third recording/reproducing unit 3 for handling 360 MB/sec widescreen component data is supplied to VTR provided in the second recording-/reproducing unit 2 for handling 143 MB/sec widescreen component data is now explained.

In this case, the 360 MB/sec widescreen component data outputted from widescreen VTR via serial interface is supplied to routing switch 4.

The routing switch 4 transmits the 360 MB/sec widescreen component data to second bit rate converting circuit 11 in the bit rate converter 5.

Using BRD, the second bit rate converter 11 converts the 360 MB/sec widescreen component data into 143 MB/sec widescreen composite data, as shown in FIG. 3t.

That is, the 360 MB/sec widescreen component data is processed by BRD shown in FIG. 8 with a bit number reducing operation and converted into 143 MB/sec widescreen component data before being supplied to routing switch 4.

The routing switch 4 transmits the 143 MB/sec widescreen component data to VTR provided in the second recording/reproducing unit 2 for handling 143 MB/sec widescreen component data.

In this manner, playback data from widescreen VTR provided in the third recording/reproducing unit 3 may be recorded and/or reproduced by VTR provided in the second recording/reproducing unit 2 for handling 143 B/sec widescreen component data.

The manner in which playback data from widescreen VTR provided in the third recording/reproducing unit 3 for handling 360 MB/sec widescreen component data is supplied to D1VTR provided in the first recording-/reproducing unit 1 for handling 270 MB/sec component data is now explained.

In this case, the 360 MB/sec widescreen component data outputted from widescreen VTR via serial interface is supplied to routing switch 4.

The routing switch 4 transmits the 360 MB/sec widescreen component data to the third second bit rate converting circuit 12 in the bit rate converter 5.

Using MSK, the third bit rate converter 12 converts the 360 MB/sec widescreen component data into 270 MB/sec composite data, as shown in FIG. 3u.

By being masked by MSK shown in FIG. 5, the 360 MB/sec widescreen component data is converted from the data with the aspect ratio of 16:9 into output data with the aspect ratio of 4:3.

The resulting 270 MB/sec component data is supplied to routing switch 4.

The routing switch 4 transmits the 270 MB/sec component data to D1VTR provided in the first recording-/reproducing unit 1.

In this manner, playback data from widescreen VTR provided in the third recording/reproducing unit 3 for handling 360 MB/sec widescreen component data may be recorded and/or reproduced by D1VTR provided in the first recording/reproducing unit 1 for handling 270 MB/sec composite data.

The manner in which playback data from widescreen VTR provided in the third recording/reproducing unit 3 for handling 360 MB/sec widescreen component data is supplied to VTR provided in the first recording/reproducing unit 1 for handling 270 MB/sec widescreen component data is now explained.

In this case, the 360 MB/sec widescreen component data outputted from widescreen VTR via serial interface is supplied to routing switch 4.

The routing switch 4 transmits the 360 MB/sec widescreen component data to third bit rate converting circuit 12 in the bit rate converter 5.

Using BRD, the third bit rate converter 12 converts the 360 MB/sec widescreen component data into 27.0 MB/sec widescreen composite data, as shown in FIG. 3v.

That is, the 360 MB/sec widescreen component data is processed by BRD shown in FIG. 8 with the above-mentioned bit number reducing operation for being converted into 270 MB/sec bit rate widescreen component data.

The 270 MB/sec widescreen component data is supplied to routing switch 4.

The routing switch 4 transmits the 270 MB/sec widescreen component data to VTR provided in the first recording/reproducing unit 1 for handling 270 MB/sec widescreen component data.

In this manner, playback data from widescreen VTR provided in the third recording/reproducing unit 3 for handling 360 MB/sec widescreen component data may be recorded and/or reproduced by VTR provided in the first recording/reproducing unit 1 for handling 270 MB/sec composite data.

Meanwhile, the first recording/reproducing unit 1 and the second recording/reproducing unit 2 are provided with means for changing a data system with a bit rate with another data system with the same bit rate.

More concretely, if playback data from D2VTR handling the 143 MB/sec composite data is to be supplied to another VTR handling 143 MB/sec component data, the second recording/reproducing unit 2 converts the 143 MB/sec composite data into 143 MB/sec component data, using DEC and BRD, as shown at 91 in FIG. 3.

That is, the 143 MB/sec composite data is first supplied to DEC.

As explained with DEC 23 in FIG. 4, the DEC converts the 143 MB/sec composite data (luminance data Y, first chroma data $C_I$ and second chroma data $C_Q$) into luminance data Y, first chroma data $C_1$ and second chroma data $C_2$ which are component data.

The luminance data Y, first chroma data $C_I$ and second chroma data $C_Q$ of the composite data are composed of 10 bits in a lump, so that, if the composite data are converted into component data, the luminance data Y, first chroma data $C_I$ and the second chroma data $C_Q$ are each composed of 10 bits resulting in threefold increase in the number of bits. Since the above 143 MB/sec transmission rate cannot be maintained in such case, the luminance data Y, first chroma data $C_1$ and second chroma data $C_2$ are supplied to BRD.

The luminance data Y, first chroma data $C_1$ and the second chroma data $C_2$, each having 10 bits, are processed by BRD with a bit number reducing operation for compatibility with the transmission rate of 143 MB/sec and the resulting signals are transmitted to VTR handling the 143 MB/sec component data.

In this manner, the playback data from D2VTR handling the 143 MB/sec composite data may be recorded and/or reproduced in the second recording/reproducing unit 2 by the VTR handling the above-mentioned 143 MB/sec component data.

The manner in which the playback data from D2VTR handling the 143 MB/sec composite data is supplied in the second recording/reproducing unit 2 to VTR handling the 143 MB/sec widescreen component data is now explained.

Using DEC, BRD and ADD, the second recording/reproducing unit 2 converts the 143 MB/sec composite data into 143 MB/sec widescreen component data, as shown at 92 in FIG. 3.

That is, the 143 MB/sec composite data is first converted by DEC and BRD into 143 MB/sec component data, as described above.

The 143 MB/sec component data are the data having the aspect ratio of 4:3, as described above. Consequently, the 143 MB/sec component data is supplied to ADD for conversion into widescreen data having the aspect ratio of 16:9, which data is supplied to VTR handling the 143 MB/sec widescreen component data.

In this manner, the playback data from D2VTR handling the 143 MB/sec composite data may be recorded and/or reproduced by VTR handling the 143 MB/sec widescreen component data.

The manner in which the playback data from VTR handling the 143 MB/sec composite data is supplied in the second recording/reproducing unit 2 to D2VTR handling the 143 MB/sec widescreen composite data is now explained.

Using ENP and BEP, the second recording/reproducing unit 2 converts the 143 MB/sec component data into 143 MB/sec widescreen composite data, as shown at 93 in FIG. 3.

The 143 MB/sec component data is first supplied to ENC for conversion into composite data as described above.

The luminance data Y, first chroma data $C_1$ and second chroma data $C_2$ of the 143 MB/sec composite data are previously processed with the bit number reducing operation for compatibility with the 143 MB/sec transmission rate, so that, if the 143 MB/sec component data is converted by ENC into the above-mentioned composite data, the resulting data is not matched to the bit rate of 143 MB/sec.

Consequently, the composite data outputted from ENC is supplied to BEP.

The composite data from ENC is processed by BEP with the bit number increasing operation for conversion into 143 MB/sec bit rate composite data which is supplied to D2VTR.

In this manner, playback data from VTR handling the 143 MB/sec component data may be recorded and/or reproduced by D2VTR handling the 143 MB/sec composite data.

The manner in which the playback data from VTR handling the 143 MB/sec component data is supplied in the second recording/reproducing unit 2 to VTR handling the 143 MB/sec widescreen component data is now explained.

Using BRD and ADD, the second recording/reproducing unit 2 converts the 143 MB/sec component data into 143 MB/sec widescreen component data, as shown at 94 in FIG. 3.

That is, the 143 MB/sec component data is the data with the aspect ratio of 4:3 which is subsequently converted by ADD into widescreen data with the aspect ratio of 16:9 with increase in the bit rate. Consequently, for reducing the increased bit rate to 143 MB/sec, the 143 MB/sec widescreen component data is first processed by BRD with the operation of reducing the number of bits before being supplied to ADD.

The ADD converts the component data, processed with the operation of reducing the number of bits, into widescreen data having the aspect ratio of 16:9, which is supplied to VTR handling the 143 MB/sec widescreen component data.

In this manner, playback data from VTR handling the 143 MB/sec component data may be recorded and/or reproduced by VTR handling the 143 MB/sec widescreen component data.

The manner in which the playback data from VTR handling the 143 MB/sec widescreen component data is supplied in the second recording/reproducing unit 2 to D2VTR handling the 143 MB/sec composite data is now explained.

Using ENP, BEP and MSK, the second recording/reproducing unit 2 converts the 143 MB/sec widescreen component data into 143 MB/sec composite data, as shown at 95 in FIG. 3.

That is, the 143 MB/sec widescreen component data is the data with the aspect ratio of 16:9 which is subsequently converted by MSK into data with the aspect ratio of 4:3 with decrease in the bit rate. For this reason, the 14.3 MB/sec widescreen component data is first processed by BEP with a bit number increasing operation before being supplied to ENC.

As described above, the ENC converts the bit number increased data, which are the component data, into composite data, which are supplied to MSK.

The MSK converts the composite data into data having the aspect ratio of 4:3 to transmit the resulting data to D2VTR.

In this manner, playback data from VTR handling the 143 MB/sec widescreen component data may be recorded and/or reproduced by D2VTR handling the 143 MB/sec composite data.

The manner in which the playback data from VTR handling the 143 MB/sec widescreen component data is supplied in the second recording/reproducing unit 2 to VTR handling the 143 MB/sec component data is now explained.

Using BEP and MSK, the second recording/reproducing unit 2 converts the 143 MB/sec widescreen component data into 143 MB/sec component data, as shown at 96 in FIG. 3.

That is, the 143 MB/sec widescreen component data is the data with the aspect ratio of 16:9 which is subsequently converted by MSK into data with the aspect ratio of 4:3 with decrease in the bit rate. For this reason, the 143 MB/sec widescreen component data is first processed by BEP with a bit number increasing operation before being supplied to MSK.

The MSK converts the bit number increased component data into data having the aspect ratio of 4:3 which is supplied to VTR handling the 143 MB/sec component data.

In this manner, playback data from VTR handling the 143 MB/sec widescreen component data may be recorded and/or reproduced by VTR handling the 143 MB/sec component data.

The manner in which playback data from D1VTR handling the 270 MB/sec component data is supplied in the first recording/reproducing unit 1 to VTR handling the 270 MB/sec widescreen component data is now explained.

Using BRD and ADD, the first recording/reproducing unit 1 converts the 270 MB/sec component data into 270 MB/sec widescreen component data, as shown at 97 in FIG. 3.

That is, the 270 MB/sec component data is the data with the aspect ratio of 4:3 which is subsequently converted by ADD into widescreen data with the aspect ratio of 16:9 with increase in the bit rate. Consequently, for reducing the increased bit rate to 270 MB/sec, the 270 MB/sec widescreen component data is first processed by BRD with the operation of reducing the number of bits before being supplied to ADD.

The ADD converts the component data, processed with the operation of reducing the number of bits, into data having the aspect ratio of 16:9 which is supplied to VTR handling the 270 MB/sec widescreen component data.

In this manner, playback data from VTR handling the 270 MB/sec component data may be recorded and/or reproduced by VTR handling the 270 MB/sec widescreen component data.

The manner in which playback data from VTR handling the 270 MB/sec widescreen component data is supplied in the first recording/reproducing unit 1 to DLVTR handling the 270 MB/sec component data is now explained.

Using BEP and MSK, the first recording/reproducing unit 1 converts the 270 MB/sec widescreen component data into 270 MB/sec component data, as shown at 98 in FIG. 3.

That is, the 270 MB/sec widescreen component data is the data with the aspect ratio of 16:9 which is subsequently converted by MSK into data with the aspect ratio of 4:3 with decrease in the bit rate. Consequently, for restoring the decreased bit rate to 270 MB/sec, the 270 MB/sec widescreen component data is first processed by BEP with the operation of increasing the number of bits before being supplied to MSK.

The MSK converts the bit number increased component data into data having the aspect ratio of 4:3 which is supplied to D1VTR handling the 270 MB/sec component data.

In this manner, playback data from VTR handling the 270 MB/sec widescreen component data may be recorded and/or reproduced by D1VTR handling the 270 MB/sec component data.

Meanwhile, since only the widescreen VTR is provided in the third recording/reproducing unit 3, the above-described data system exchange is not effected in the recording/reproducing unit.

However, if the third recording/reproducing unit includes VTRs handling 360 MB/sec bit rate composite data or 360 MB/sec composite data, besides the widescreen VTR, exchange of data of different data systems with the same bit rate may be made within the third recording/reproducing unit 3, similarly to the first and second recording/reproducing units 1 and 2, by providing circuits necessary for data system conversion, such as BEP or ADD in the third recording/reproducing unit 3.

It will be seen from above that the present invention provides a send-out system for a recording/reproducing apparatus in which first, second and third recording/reproducing units 1 to 3, each provided with plural VTRs, are interconnected by the routing switch 4, and in which the bit rate converter 5 having the first to third bit rate converting circuits 10 to 12 enabling data exchange between the units 1 to 3 is connected to the routing switch 4. When the transmitting VTR and a receiving VTR are decided, the routing switch 4 transmits the data from the transmitting VTR to the bit rate converter 5 where the bit rate is converted into one of data handled by the receiving VTR, and the resulting data is supplied to the receiving side to enable data exchange between VTRs having different data bit rates.

In the embodiment illustrated, the bit rate converter 5 is provided with the first bit rate converting circuit 10 for converting the 143 MB/sec bit rate into 270 MB/sec and the 270 MB/sec bit rate into 143 MB/sec, the second bit rate converting circuit 11 for converting the 143 MB/sec bit rate into 360 MB/sec and the 360 MB/sec bit rate into 143 MB/sec, and the third bit rate converting circuit 12 for converting the 270 MB/sec bit rate into 360 MB/sec and the 360 MB/sec bit rate into 270 MB/sec, for enabling data to be exchanged between the recording/reproducing unit 1 provided with plural recording/reproducing apparatus, such as D1VTR, handling video data with the bit rate of 270 MB/sec as shown in FIG. 1, the recording/reproducing unit 2 provided with plural recording/reproducing apparatus, such as D2VTR, handling video data with the bit rate of 143 MB/sec, and the recording/reproducing unit 3 provided with the widescreen VTR handling video data with the bit rate of 360 MB/sec, as shown in FIG. 1. If, for example, a so-called HDVTR for recording and/or reproducing high definition television signals is provided as the recording/reproducing apparatus, a bit rate converting circuit for HDVTR may be provided in the bit rate converter 5 for enabling signals to be exchanged between the recording/reproducing apparatus in their entirety.

By annexing the bit rate converting circuit conforming to the recording/reproducing apparatus provided in the system, data exchange may be made between the recording/reproducing apparatus in their entirety.

Consequently, should a recording/reproducing apparatus having a new bit rate become popular in future, it suffices to add a bit rate converting circuit for the recording/reproducing apparatus having the new bit rate as one of the plural bit rate converting means for avoiding wasteful expenses of re-purchasing the recording/reproducing apparatus in their entirety for compatibility with the recording/reproducing apparatus having the new bit rate.

With the send-out system for recording/reproducing apparatus according to the present invention, a recording/reproducing apparatus outputting a signal and a recording/reproducing apparatus receiving the signal are selected from plural recording/reproducing apparatus by input/output changeover means, while bit rate converting means associated with the input and output of the selected apparatus by the input/output changeover means are selected and interconnected by the input/output changeover means.

In this manner, video data may be exchanged between the recording/reproducing apparatus having different bit rates.

On the other hand, should a recording/reproducing apparatus having a new bit rate become popular in future, it suffices to add a bit rate converting means for the recording/reproducing apparatus having the new bit rate as one of the plural bit rate converting means for avoiding wasteful expenses of re-purchasing the recording/reproducing apparatus in their entirety for compatibility with the recording/reproducing apparatus having the new bit rate.

What is claimed is:

1. A switcher connected to a plurality of video signal inputting and outputting devices, at least two of said plurality of devices respectively handling video signals having different bit rates, said switcher comprising:
    a plurality of converting means for reciprocally converting the video signals handled by said plurality of video signal inputting and outputting devices, and
    changeover means for selecting, from said plurality of video signal inputting and outputting devices, a first one of the video signal inputting and outputting devices for outputting video signals and a second one of the video signal inputting and outputting devices for receiving said video signals, said changeover means also selecting, from said plurality of converting means, those converting means associated with the selected devices, and interconnecting the selected converting means and the selected devices.

2. The switcher as defined in claim 1 wherein said video signal inputting and outputting devices are video signal recording and/or reproducing devices.

3. A switcher connected to a plurality of video signal inputting and outputting devices, at least two of said plurality of devices respectively handling video signals having different bit rates, said switcher comprising:
    a plurality of converting means for reciprocally converting the video signals handled by said plurality of video signal inputting and outputting devices; and
    changeover means for selecting, from said plurality of video signal inputting and outputting devices, a first one of the video signal inputting and outputting devices for outputting video signals and a second one of the video signal inputting and outputting devices for receiving said video signals, said changeover means also selecting, from said plurality of converting means, those converting means associated with the selected devices, and interconnecting the selected converting means and the selected devices;
    wherein one of said converting means includes first bit rate converting means for converting video signals of a first bit rate into video signals of a second bit rate and for converting video signals of the second bit rate into video signals of the first bit rate, another of said converting means includes second bit rate converting means for converting video signals of the first bit rate into video signals of a third bit rate, the third bit rate being higher than the first and second bit rates, and for converting video signals of the third bit rate into video signals of the first bit rate, and wherein still another of said converting means includes third bit rate converting means for converting video signals of the second bit rate into video signals of the third bit rate and for converting video signals of the third bit rate into video signals of the second bit rate.

4. The switcher as defined in claim 3 wherein said first bit rate converting means has a decoder for converting composite signals into component signals and an encoder for converting component signals into composite signals.

5. The switcher as defined in claim 3 wherein said second bit rate converting means has a decoder for converting composite signals into component signals, an encoder for converting component signals into composite signals, an adder circuit for compensating for deficit of video signals on a screen and a masking circuit for masking excess video data on the screen.

6. The switcher as defined in claim 3 wherein said third bit rate converting means has an adder circuit for compensating for a deficit of video signals on the screen and a masking circuit for masking excess video data on the screen.

7. The switcher as defined in claim 3 wherein said video signal inputting and outputting devices are video signal recording and/or reproducing devices.

8. A switcher connected to a plurality of video signal inputting and outputting devices, at least two of said plurality of devices respectively handling video signals having different bit rates, said switcher comprising:
    a plurality of converting means for reciprocally converting the video signals handled by said plurality of video signal inputting and outputting devices, said plurality of converting means including first bit rate converting means for converting signals of a first bit rate into signals of a second bit rate and vice versa, second bit rate converting means for converting signals of the first bit rate into signals of a third bit rate and vice versa, third bit rate converting means for converting signals of the second bit rate into signals of third bit rate and vice versa; and
    changeover means for selecting, from said plurality of video signal inputting and outputting devices, a first one of the video signal inputting and outputting devices for outputting video signals and a second one of the video signal inputting and outputting devices for receiving said video signals, said changeover means also selecting, from said plurality of converting means, those converting means associated with the selected devices, and interconnecting the selected converting means and the selected devices;

wherein at least one of said first, second and third bit rate converting means includes an encoder for converting component signals into composite signals, a decoder for converting composite signals into component signals, a masking circuit for masking excess video signals on the screen and an adder circuit for compensating for a deficit of video data on the screen.

9. The switcher as defined in claim 8 wherein at least one of said first, second and third bit rate converting means includes a bit reduction circuit for reducing the number of bits of the video signals and a bit expander circuit for increasing the number of bits.

10. The switcher as defined in claim 7 wherein said video signal inputting and outputting devices are video signal recording and/or reproducing devices.

* * * * *